United States Patent [19]

Yakymyshyn et al.

[11] Patent Number: 5,739,936
[45] Date of Patent: Apr. 14, 1998

[54] ELECTRO-OPTICAL CIRCUIT FOR SIGNAL TRANSMISSION

[75] Inventors: Christopher Paul Yakymyshyn, Raleigh, N.C.; Peter Bernard Roemer, North Andover, Mass.; Ronald Dean Watkins, Niskayuna, N.Y.

[73] Assignee: General Electric Company, Schenectady, N.Y.

[21] Appl. No.: 430,052

[22] Filed: Apr. 27, 1995

[51] Int. Cl.[6] .................................................. H04B 10/12
[52] U.S. Cl. ............................ 359/154; 359/161; 359/181
[58] Field of Search .................................. 359/180, 181, 359/183, 189, 195, 154, 161, 124; 372/29, 32, 31; 375/318; 371/70

[56] References Cited

U.S. PATENT DOCUMENTS

| | | | |
|---|---|---|---|
| 3,968,361 | 7/1976 | Bumgardner | 359/189 |
| 4,393,518 | 7/1983 | Briley | 359/161 |
| 5,105,293 | 4/1992 | Bortolini | 359/154 |
| 5,126,871 | 6/1992 | Jeffers | 359/181 |
| 5,267,072 | 11/1993 | Maleki | 359/189 |
| 5,444,740 | 8/1995 | Mizukami et al. | 375/286 |
| 5,510,922 | 4/1996 | Naito | 359/124 |

*Primary Examiner*—Rafael Bacares
*Attorney, Agent, or Firm*—Marvin Snyder; Douglas E. Stoner

[57] ABSTRACT

An electro optical circuit for transmitting an information bearing signal, such as a signal in the RF, AF or microwave frequency domains, to a predetermined location includes a laser for generating coherent light to be used as a carrier, and an electro optical modulator for receiving the information signal and the coherent light and generating first and second modulated light signals which respectively comprise the coherent light modulated by the information signal and the coherent light modulated by the inversion of the information signal. The first and second modulated light signals are supplied to a detector at the predetermined location through separate optical paths. The detector converts the first modulated light signal into a first DC component, representing the laser-generated coherent light, and into a first information component representing the information signal, and converts the second modulated light signal into a second DC component which also represents the laser-generated coherent light, and into a second information component representing the inversion of the information signal and which is thus in an anti-phase relationship with the first information component. The detector combines the first and second DC current components so that they mutually nullify each another.

14 Claims, 3 Drawing Sheets

ELECTRO-OPTICAL CIRCUIT FOR SIGNAL TRANSMISSION

BACKGROUND OF THE INVENTION

This invention relates to improved electro-optical circuits for transmitting an RF or other high frequency signal to a specified location, and more particularly, to such circuit wherein the high frequency signal modulates light from a laser exhibiting low distortion caused by noise originating in the laser, and which transmits the modulated laser light, in analog form, through an optical path to the specified location.

High performance analog optical links, e.g., transmission paths using CW laser light, have been demonstrated using audio frequency (AF), radio frequency (RF) and microwave frequency modulation, and have been shown to provide significant signal gain. Generally, in such arrangements, the coherent light produced by a laser serves as a carrier wave which is intensity modulated by the respective AF, RF or microwave signals. Analog optical links of such type, used in connection with an RF signal, have previously provided gain of 11 dB over a frequency range of 40-80 MHz.

Analog optical transmission of signals can be useful in magnetic resonance (MR) systems. In such systems, whether designed for spectroscopy, imaging or other application, an RF pulse is transmitted into a subject of interest (e.g., body tissue). In response, the subject emits an RF signal which is detected by an MR receive coil and thereafter transmitted to a signal processing station, which may be remotely located, for processing to obtain information about the subject. However, detected MR signals are inherently very weak, and the MR environment typically contains a great deal of electromagnetic noise. Transmissions through an electrical path may be significantly degraded by such noise, whereas transmissions through an optical path are not affected thereby. It would therefore be advantageous to transmit detected MR signals from the receive coil to the signal processing electronics through an optical conductive path, such as an analog optical link, rather than through an electrical cable.

In a conventional analog optical link of the type referred to above, a laser is required to provide the coherent light that constitutes the optical carrier wave. As known to those of skill in the art, the laser introduces amplitude noise, referred to as Relative Intensity Noise (RIN), into the analog optical link. RIN substantially increases the noise figure, which is a measure, in dB, of the noise present in a signal transmission path or circuit. Generally, it is desirable to keep the noise figure as low as possible. While there are several contributors to noise in such analog optical link, e.g., laser and modulator impedance thermal noise, shot noise and detector dark noise, the most significant contributor to noise figure is the RIN of the laser. For example, in one comparison it was found that RIN noise voltage was on the order of twenty times the noise voltage due to source impedance.

SUMMARY OF THE INVENTION

Briefly, in accordance with a preferred embodiment of the invention, an electro-optical circuit for transmitting a signal, such as an RF, AF or microwave signal, to a predetermined location includes a laser for generating a coherent light beam, and electro-optical modulating means which receives both the coherent light beam and an information signal, such as an RF frequency signal. The modulating means generates first and second modulated light signals, which respectively comprise the coherent light beam modulated by the information signal, and the coherent light beam modulated by the inversion of the information signal. Thus the modulating signals for the first and second modulated light signals are in anti-phase relationship with respect to one another. The invention further includes detector means at the predetermined location for converting the first modulated light signal into two electric current components respectively comprising a first direct current (DC) component corresponding to the coherent light beam, and a first information bearing component corresponding to the information signal. The detector means further comprises means for converting the second modulated light signal into two electric current components, respectively comprising a second DC component corresponding to the coherent light beam, and a second information bearing component corresponding to the information signal, but inverted from the first information bearing component. The detector means includes means for combining the first and second DC current components to mutually cancel one another, and for combining the first and second information bearing current components to mutually reinforce one another, to provide an output signal which comprises the information signal. The invention also includes means for establishing respective first and second optical paths, from the modulating means to the detector means, for the respective first and second modulated light signals.

In a preferred embodiment, the means for establishing the first and second optical paths respectively comprise first and second fiber optic cables of lengths having a specified relationship with respect to one another. Preferably, the difference in length between the first and second optical paths is no greater than c/n(BW), where c is the speed of light, n is the optical refractive index of the fiber optic cables and BW is the anticipated frequency range of the information signal.

The invention also contemplates a differential method for transmitting an RF or other information bearing signal to a predetermined destination by providing a coherent light beam, generating first and second modulated light signals respectively comprising the coherent light beam modulated by an information signal and by the inversion of the information signal, and transmitting the first and second modulated light signals to the predetermined destination through separate respective optical transmission paths. At the destination, the first and second modulated light signals are converted into first and second DC current components, each of which corresponds to the coherent light beam, a first information current component corresponding to the information signal, and a second information current component corresponding to the inversion of the information signal. The first and second DC current components are combined to mutually cancel each other, or the effects thereof, and the first and second information current components are combined to reproduce the information signal.

One object of the invention is to provide an improved, low noise optical transmission path for information signals at RF and other frequencies.

Another object is to provide a path for RF signal transmission between the receive coil and signal processing electronics of an MR system, in which undesirable effects of noise originating in an associated laser light source are significantly reduced.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s).

DETAILED DESCRIPTION OF THE PREFERRED EMBODIMENT

Figure 1:
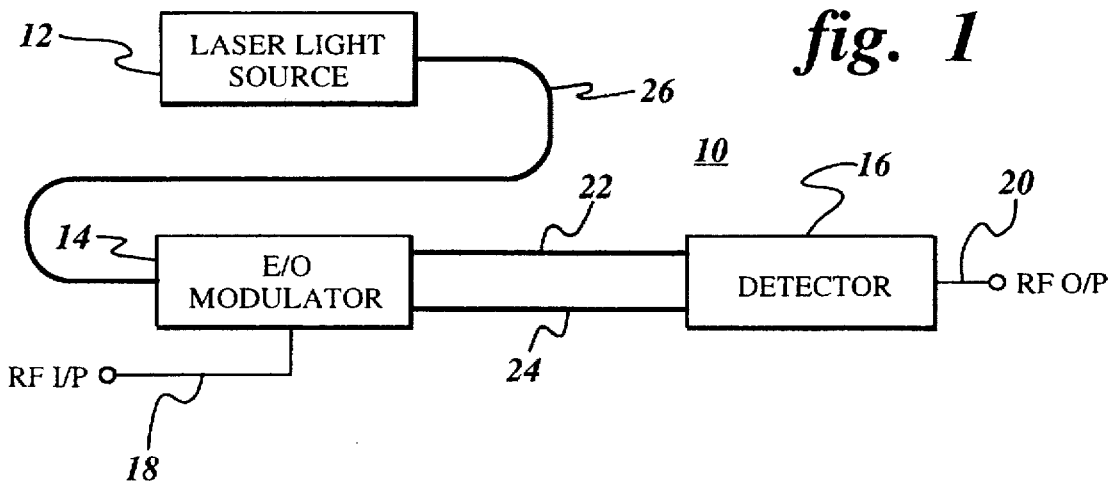
FIG. 1 is a block diagram of one embodiment of the electro-optical circuit of the invention.

FIG. 1 illustrates an electro-optical circuit in the form of an analog optical link or system 10, generally comprising a CW laser as a coherent light source 12, an electro-optic modulator 14, and an optical detector 16. Optical link 10 functions to transmit an information signal, such as a signal at an AF, RF or microwave frequency, from modulator 14 to detector 16. The information signal is supplied to modulator 14 through a modulator input terminal 18, and is coupled from detector 16 through a detector output terminal 20. As described hereinafter in greater detail, modulator 14 generates modulated light signals $L_{m1}$ and $L_{m2}$ which are supplied to detector 16 through fiber-optic cables 22 and 24, respectively. A coherent light beam from a CW laser 12 is transmitted to modulator 14 through a fiber-optic cable 26, and serves as the optical carrier signal.

In one useful application, optical link 10 may be employed in an MR system. In that instance, input terminal 18 receives an information-bearing RF signal from the receive coil of the MR system (not shown) and output terminal 20 is connected to remotely-located MR signal processing electronics. For purposes of illustration, the information-bearing signal received by input terminal 18 is referred to as an RF signal. It will be appreciated that optical link 10 could, alternatively, find application in an ultrasonic imaging system, a phased-array radar control, or a high-speed local area network.

Figure 2:
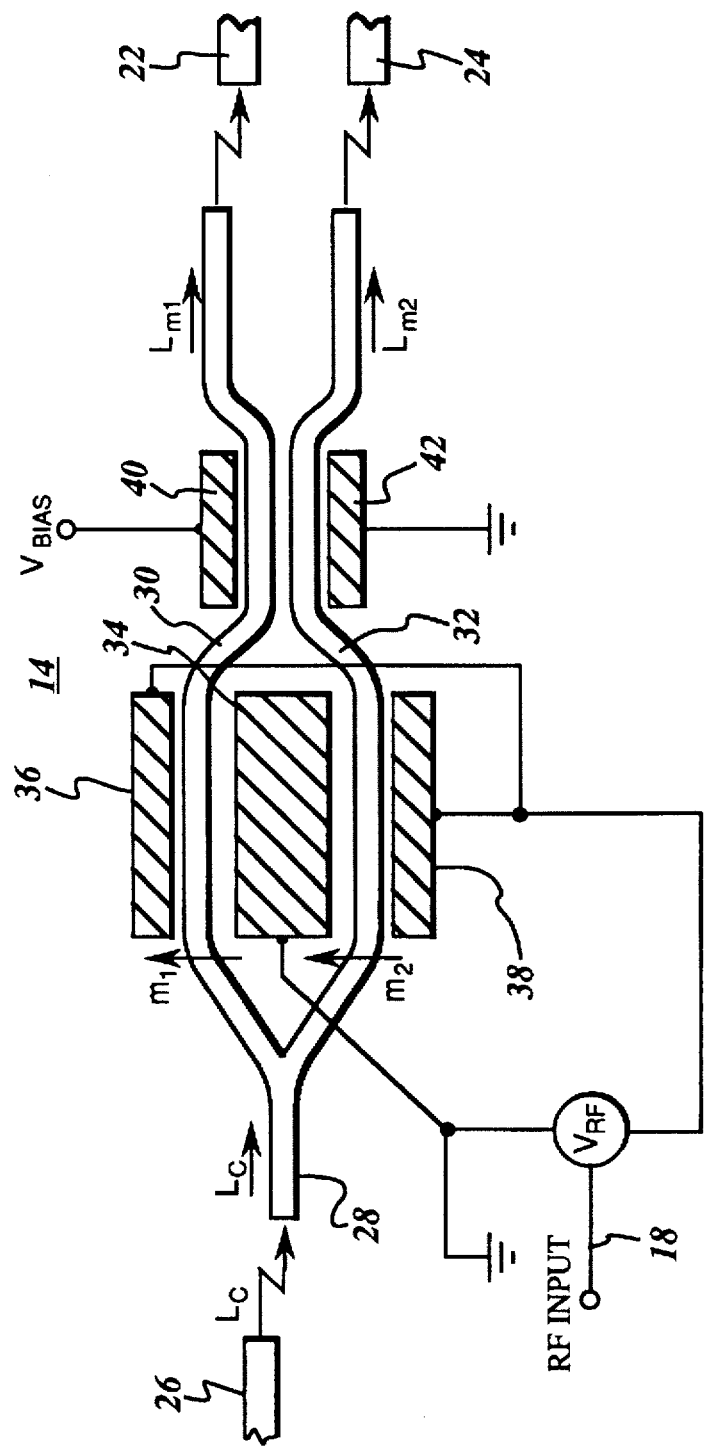
FIG. 2 is a simplified cross-sectional diagram, of an energized modulator that may be employed in the electro-optical circuit of FIG. 1.

FIG. 2 shows an electro-optic modulating device which may be usefully employed as modulator 14, and is conventionally known as a Mach-Zehnder interferometer. The particular Mach-Zehnder interferometer shown in FIG. 2 is a 1×2 directional coupler, as described, for example, by Howerton, Bulmer and Burns in "Linear 1×2 Directional Coupler for Electromagnetic Field Detection", *Appl. Phys. Lett.* 52 (22), 30 May 1988, pp. 1850–1852.

Modulating device 14 includes an input optical waveguide 28 coupled to receive a coherent light beam $L_c$ from laser 12 through fiber-optic cable 26. Waveguide 28 is optically coupled to output optical waveguides 30 and 32, which are symmetrical to one another so that 50% of the light traversing input waveguide 28 passes into each respective one of output waveguides 30 and 32.

Also shown in FIG. 2 are an electrode 34 positioned between output waveguides 30 and 32, and electrodes 36 and 38 respectively positioned along the sides of waveguides 30 and 32 in opposing relationship with electrode 34. Electrode 34 is coupled to ground, and RF signals from input terminal 18 are supplied as a voltage $V_{RF}$ to both electrodes 36 and 38.

As the RF input signal varies, voltage $V_{RF}$ establishes an electric field $m_1$ between electrodes 36 and 34 which thus varies with the RF input signal. The index of refraction of optical waveguide 30 positioned between electrodes 36 and 34, and therefore the velocity of the portion of information-bearing coherent light beam $L_c$ directed therethrough, varies in corresponding relationship with amplitude of electric field $m_1$. Thus, the RF input signal effectively amplitude modulates the coherent light beam to produce a light signal $L_{m1}$.

Similarly, the index of refraction of optical waveguide 32 positioned between electrodes 38 and 34, and therefore the velocity of the portion of information-bearing coherent light beam $L_c$ directed there through, varies in corresponding relationship with amplitude of an electric field $m_2$ established by voltage $V_{RF}$, to provide an amplitude modulated light signal $L_{m2}$. Thus the RF input Signal effectively amplitude modulates the coherent light beam to produce a light signal $L_{m2}$. However, because of the geometric relationship between waveguide 32 and electrodes 34 and 38, the modulating electric field $m_2$ is the inverse of modulating electric field $m_1$, and therefore of the RF input signal, with respect to coherent light beam $L_c$. Thus, the modulating electric fields $m_1$ and $m_2$ are of equal magnitude, but opposite polarity, and are therefore in anti-phase relationship with each other. The modulation components of their respective corresponding frequency modulated light signals, $L_{m1}$ and $L_{m2}$, are likewise in anti-phase relationship with each other.

FIG. 2 further shows output waveguides 30 and 32 positioned between a pair of electrodes 40 and 42, and coming close together therebetween. The proximity of waveguides 30 and 32 between electrodes 40 and 42 results in cross-coupling of light signals $L_{m1}$ and $L_{m2}$. Light from either waveguide cross-coupled into the other constructively or destructively interferes with the light in the other waveguide, to vary the intensity of light emanating from waveguides 30 and 32. The cross coupling of light between waveguides 30 and 32 is controlled by an electric field established between electrodes 40 and 42 by a DC voltage $V_{bias}$. Voltage $V_{bias}$ is selected to maintain the ratio of light from each of such waveguides at 50%, so that modulated light signals $L_{m1}$ and $L_{m2}$ are of equal optical power and intensity. Light signal $L_{m1}$ is coupled from waveguide 30 into fiber-optic cable 22, and light signal $L_{m2}$ is coupled from waveguide 32 into fiber-optic cable 24.

Figure 3:
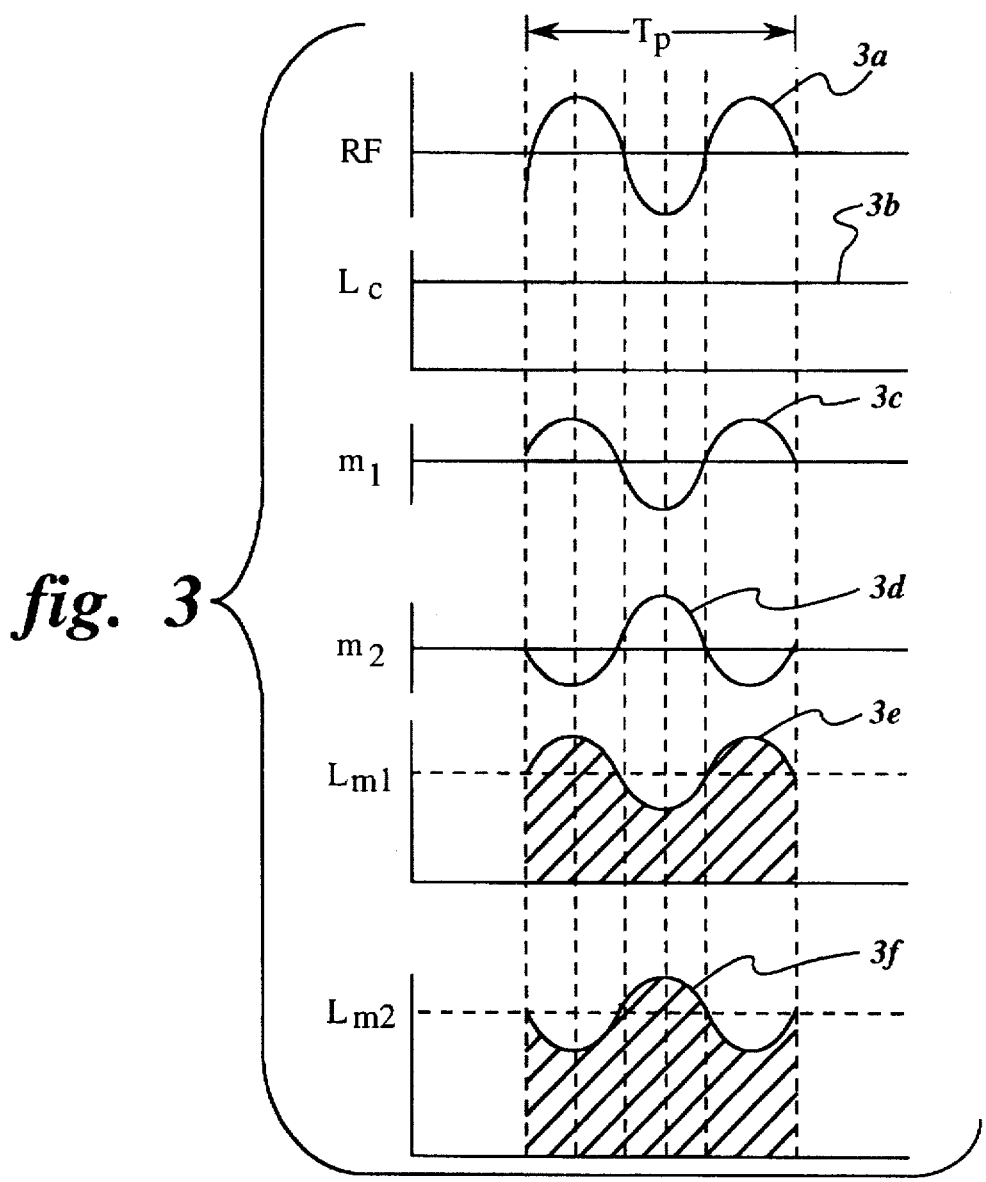
FIG. 3 is a set of waveform diagrams illustrative of signals respectively pertaining to operation of the modulator shown in FIG. 2.

In FIG. 3, waveform 3a represents a sinusoidal RF signal over a time period $T_p$, for purposes of illustration. Waveform 3b represents the coherent light $L_c$ provided by laser 12 (FIG. 1) which is of constant magnitude or intensity, and serves as the optical carrier for modulating signals produced by electric fields $m_1$ and $m_2$. Waveforms 3c and 3d illustrate the anti-phase relationship, as stated above, between electric fields $m_1$ and $m_2$.

Waveform 3e represents modulated light signal $L_{m1}$ which is made up of coherent light beam $L_c$ amplitude modulated by electric field $m_1$, which, in turn, corresponds to the RF input signal to modulator 14 (FIG. 1). Waveform 3f represents modulated light signal $L_{m2}$ made up of coherent light beam $L_c$ amplitude modulated by electric field $m_2$, which corresponds in magnitude to the RF input signal at any time, but is always of opposite polarity to the RF input signal.

Figure 4:
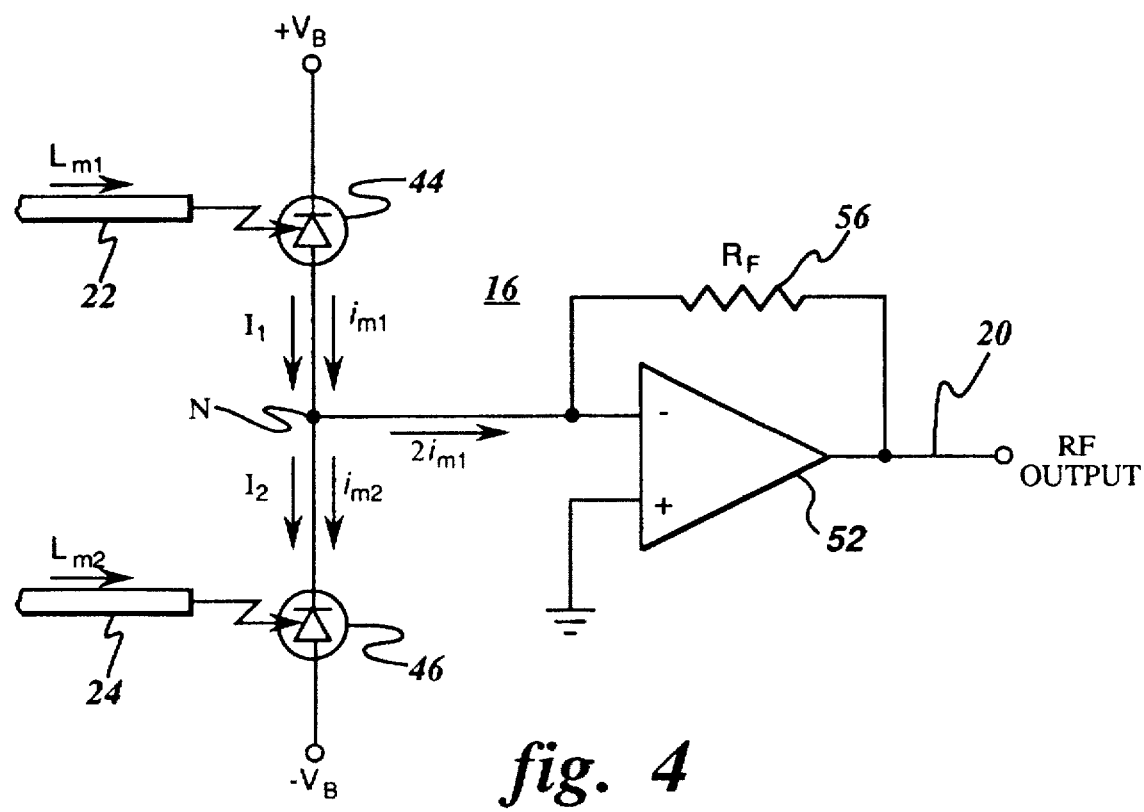
FIG. 4 is a schematic diagram of a detector that may be employed in the electro-optical circuit of FIG. 1.

FIG. 4 illustrates apparatus which may be employed as detector 16. A pair of photodiodes 44 and 46, each usefully comprising a PIN diode, are connected in series-aiding fashion through a node N. Node N is also coupled to the negative input terminal of an operational amplifier 52, and a feedback resistor 56 is coupled between the negative input terminal and the output terminal of amplifier 52. The cathode of photodiode 44 is coupled to a positive biasing voltage $V_B$, and the anode of photodiode 46 is coupled to a negative biasing voltage $-V_B$, so that photodiodes 44 and 46 are both reverse-biased.

Fiber-optic cable 22 directs modulated light signal $L_{m1}$ onto photodiode 44 and fiber-optic cable 24 directs modulated light signal $L_{m2}$ onto photodiode 46. In response to modulated light signal $L_{m1}$, photodiode 44 generates an electric current $I_1 + i_{m1}$. Current $I_1$ is a DC photocurrent representing the coherent light $L_c$ from laser 12 (FIG. 1) and current $i_{m1}$ represents the modulating electric field $m_1$ and therefore the RF input signal to the circuit of FIG. 1. In response to modulated light signal $L_{m2}$, photodiode 46 generates an electric current $I_2 + i_{m2}$. Current $I_2$ is a DC photocurrent representing the coherent light $L_c$ from laser 12 (FIG. 1), and current $i_{m2}$ represents the modulating electric field $m_2$. Thus $I_1 = I_2$, and $i_{m1} = -i_{m2}$.

Since photodiode 44 is reverse-biased, the DC photocurrent $I_1$ is directed from voltage source $V_B$ and toward node N. In like manner, since photodiode 46 is also reverse-biased, DC photocurrent $I_2$ is directed toward voltage source $-V_B$ and away from node N. Since currents $I_1$ and $I_2$ are equal, no DC component of those currents can pass from node N to amplifier 52. The effects of photocurrents $I_1$ and $I_2$ are thus mutually nullified, preventing any signal component representing light beam $L_c$ and thus any RIN noise from laser 12 (FIG. 1), from being introduced into amplifier 52. At the same time, current of value $2i_{m1}$ flows from node N to the negative input of amplifier 52, thus limiting the input current to amplifier 52 to a value representing twice the electric field voltage $m_1$. The input current to amplifier 52, with appropriate amplifier gain, results in an RF signal which matches the RF input signal supplied to the apparatus shown in FIG. 2.

It will be readily apparent that the phase relationship between modulated light signals $L_{m1}$ and $L_{m2}$ is very important, particularly to ensure mutual cancellation, at the input of amplifier 52, of DC photocurrents $I_1$ and $I_2$ representing the light from the laser source. This mutual cancellation is achieved by providing lengths for optic cables 22 and 24 such that the difference D between the lengths of the optical paths respectively traversed by modulated light signals $L_{m1}$ and $L_{m2}$ is much less than c/n(BW), BW being the required bandwidth of the RF or other information signal over which RIN cancellation is desired. For RF applications where BW is on the order of 100 MHz, D must be in the range of 0.2–0.3 meters or less to realize full benefit of RIN noise cancellation; however, even if path length difference D exceeds such limitation, source RIN noise will still be partially canceled.

It will also be apparent that optical power can be substantially increased, without an increase in RIN, as long as a balance is maintained between the optical intensities of the light signals in the optical paths respectively provided through fiber-optic cables 22 and 24.

Figure 5:
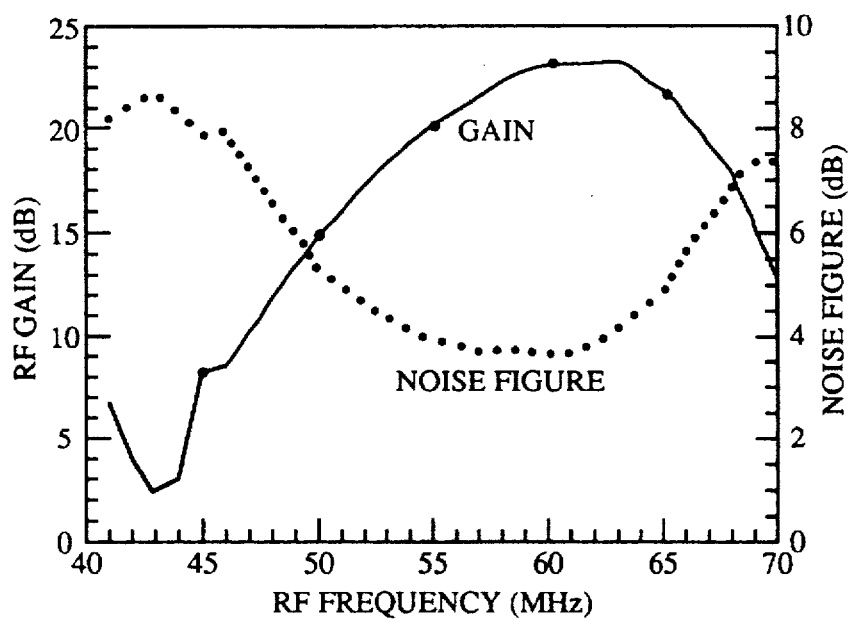
FIG. 5 is a graph illustrating results obtained by operating the electro-optical circuit shown in FIG. 1.

FIG. 5 is a plot of data obtained using analog optical link 10 shown in FIG. 1. In particular, FIG. 5 illustrates RF gain versus RF frequency for link 10, and also Noise Figure versus RF frequency. A significant increase in gain, accompanied by a corresponding reduction in Noise Figure can be seen over a frequency range of approximately 50–65 MHz.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electro-optical circuit for transmitting an information signal to a predetermined location, comprising:
   a laser for generating a coherent light beam;
   modulating means for receiving said coherent light beam and said information signal for generating first and second modulated light signals by modulating said coherent light beam with said information signal and an inversion of said information signal;
   detector means at said predetermined location for converting said first modulated light signal into electric current components comprising a first DC current component corresponding to said coherent light beam and a first information current component corresponding to said information signal, and for converting said second modulated light signal into electric current components comprising a second DC current component corresponding to said coherent light beam and a second information current component corresponding to the inversion of said information signal;
   said detector means further comprising conductor means for combining said first and second DC current components to mutually nullify effects thereof, and for combining said first and second information current components to mutually reinforce one another to provide an output signal representing said information signal; and
   means for establishing respective first and second optical transmission paths for said first and second modulated light signals between said modulating means and said detector means.

2. The circuit of claim 1 wherein said first and second optical transmission paths have a specified length relationship with each other.

3. The circuit of claim 1 wherein lengths of said first and second optical transmission paths differ from each other by less than a specified maximum value.

4. The circuit of claim 3 wherein said first and second optical transmission paths respectively comprise fiber optic cables of a predetermined optical refractive index.

5. The circuit of claim 4 wherein said information signal is of a predetermined bandwidth, and wherein the specified maximum value is determined by dividing the speed of light by a quantity comprising said optical refractive index multiplied by said bandwidth.

6. The circuit of claim 3 wherein said specified maximum value is 0.3 meters for an information signal bandwidth on the order of 100 MHz.

7. An electro optical circuit for transmitting an information signal to a predetermined location comprising:
   a laser for generating a coherent light beam;
   modulating means for receiving said coherent light beam and said information signal for generating first and second modulated light signals by modulating said coherent light beam with said information signal and an inversion of said information signal;
   first and second optical transmission paths for respectively coupling said first and second modulated light signals from said modulating means to said predetermined location; and
   first and second series-coupled photodiodes at said predetermined location for respectively receiving said first and second modulated light signals and being responsive thereto to respectively generate first and second DC photocurrents, each of said photocurrents corresponding to said coherent light beam, and first and second information current components, said first and second DC currents being combinable to mutually nullify effects of said DC current components, and said first and second information current components being combinable to provide an output signal representing said information signal.

8. The circuit of claim 7 including amplifier means coupled to said first and second photodiodes for amplifying a summation of said first and second information current components to provide said output signal.

9. The circuit of claim 7 wherein said first and second optical transmission paths have a specified length relationship with each other.

10. The circuit of claim 9 wherein said information signal is of a predetermined bandwidth, said first and second optical transmission paths respectively comprise fiber optic cables having a predetermined optical refractive index and wherein the specified lengths of said first and second optical transmission paths differ from each other by less than a maximum value determined by dividing the speed of light by a quantity comprising said optical refractive index multiplied by said bandwidth of said information signal.

11. The circuit of claim 1 wherein said modulating means comprises a Mach-Zehnder interferometer.

12. A method for transmitting an information signal to a remote location, said method comprising the steps of:

providing a source of coherent light;

generating first and second modulated light signals respectively comprising said coherent light modulated by said information signal, and said coherent light modulated by an inversion of said information signal;

transmitting said first and second modulated light signals, respectively, to said remote location through first and second optical transmission paths, respectively;

at said remote location, converting said transmitted first and second modulated light signals into first and second DC current components $I_1$, $I_2$ which both correspond to said coherent light produced by said source, a first information current component corresponding to said information signal, and a second information current component corresponding to the inversion of said information signal; and combining said first and second DC current components to mutually nullify effects thereof, and combining said first and second information current components to provide said information signal.

13. The method of claim 12 wherein said first and second optical transmission paths have a specified length relationship with each other.

14. The method of claim 13 wherein said information signal is of a predetermined bandwidth, said first and second optical transmission paths respectively are of a predetermined optical refractive index, and wherein the lengths of said first and second optical transmission paths differ from each other by less than a maximum value determined by dividing the speed of light by a quantity comprising said optical refractive index multiplied by said bandwidth.

* * * * *